United States Patent [19]

Sipusic et al.

[11] 4,084,466
[45] Apr. 18, 1978

[54] APPARATUS FOR SEVERING THIN-WALLED TUBING ON A MANDREL

[75] Inventors: Frank Sipusic, Brookfield; Arthur L. Sheridan, Woodridge, both of Ill.

[73] Assignee: Union Carbide Corporation, New York, N.Y.

[21] Appl. No.: 645,037

[22] Filed: Dec. 29, 1975

Related U.S. Application Data

[62] Division of Ser. No. 468,106, May 8, 1974, Pat. No. 3,942,221.

[51] Int. Cl.² .............................................. B23D 21/00
[52] U.S. Cl. .......................................... 83/193; 83/623; 83/697
[58] Field of Search ................... 83/11, 54, 193, 194, 83/513, 697, 600, 636, 623; 17/42, 49; 30/90.1, 91.2

[56] References Cited

U.S. PATENT DOCUMENTS

| 2,552,958 | 5/1951 | Graham et al. ............... 83/542 X |
| 3,112,517 | 12/1963 | Ives ............................................. 17/42 |
| 3,315,300 | 4/1967 | Ziolko ....................................... 17/42 |

FOREIGN PATENT DOCUMENTS 784,289 10/1957 United Kingdom ................. 83/193

*Primary Examiner*—Othell M. Simpson
*Assistant Examiner*—John Sipos
*Attorney, Agent, or Firm*—Fred I. Nathanson

[57] ABSTRACT

Apparatus for automatically severing flexible, thin-walled tubing of indefinite length into a plurality of segments comprising in combination means for advancing a continuous length of thin-walled tubing about a mandrel; a restraining member adaptable to restrain the advance of the thin-walled tubing at a predetermined position on said mandrel intermediate the ends of the tubing; tensioning means adapted for engaging the thin-walled tubing that has advanced beyond said restraining member after said restraining menber restrains the advance of the tubing and for tensioning said tubing about said mandrel intermediate said restraining member and said tensioning means; and at least two severing means mounted uniformly about said mandrel and adapted for being radially moved into and out of severing engagement with the thin-walled tubing about said mandrel intermediate said restraining member and said tensioning means.

11 Claims, 13 Drawing Figures

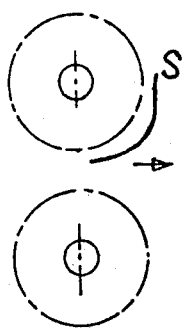
Fig. 3
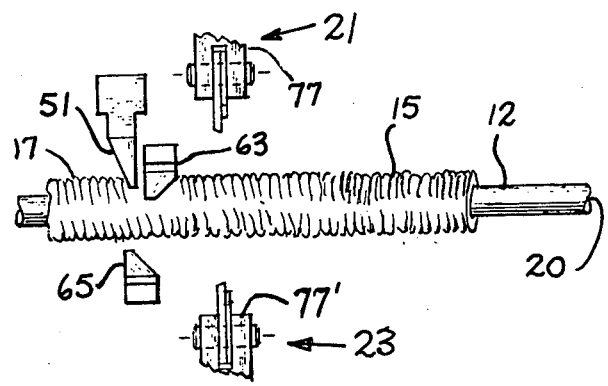
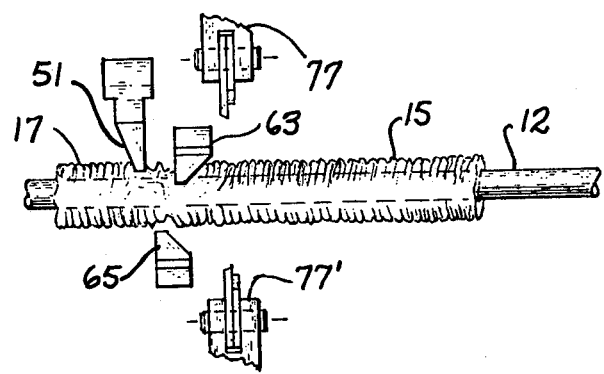
Fig. 4
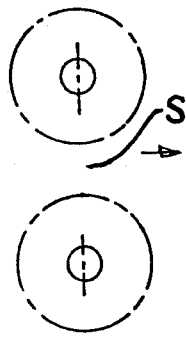
Fig. 5
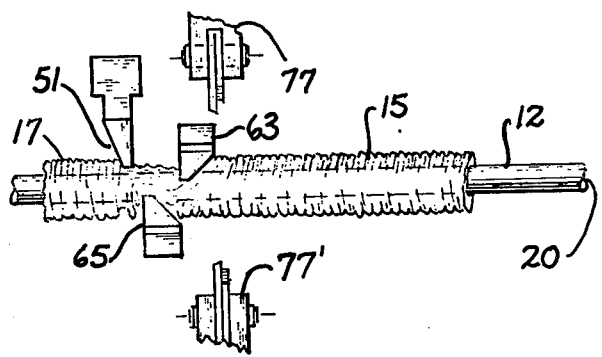

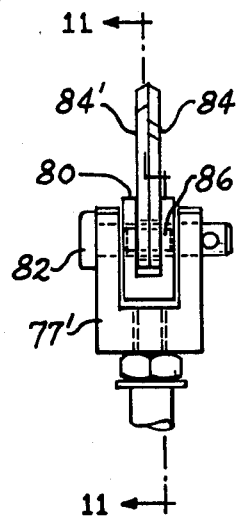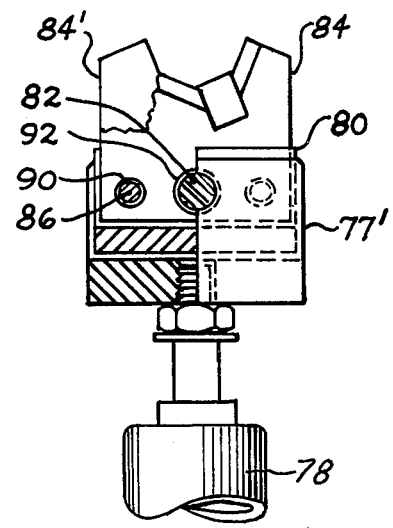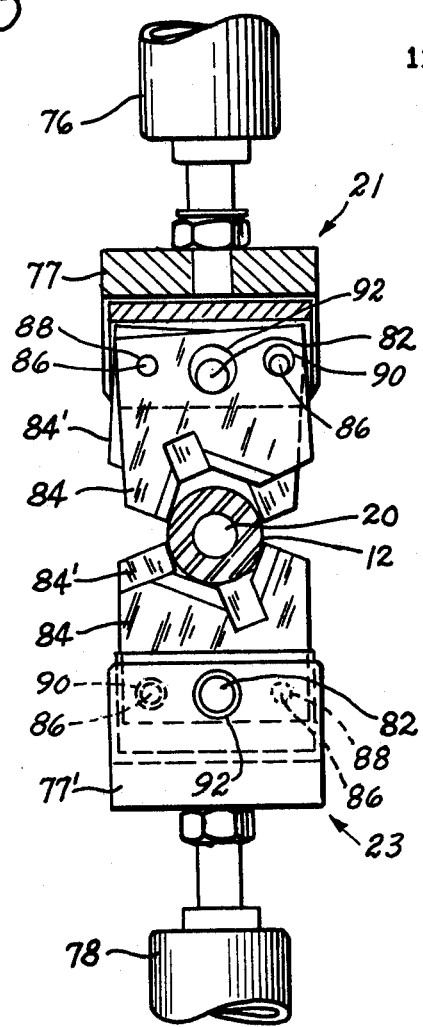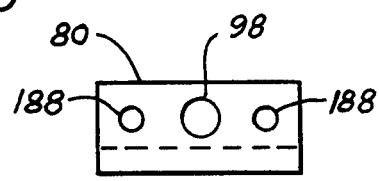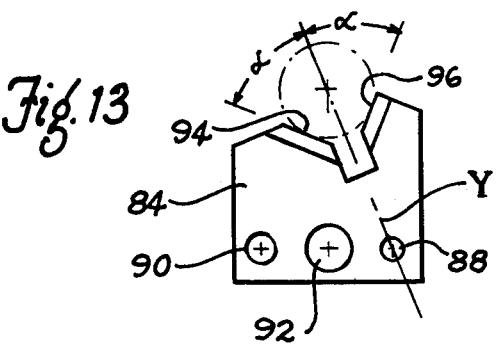

APPARATUS FOR SEVERING THIN-WALLED TUBING ON A MANDREL

This application is a division of application Ser. No. 468,106, filing date May 8, 1974, now U.S. Pat. No. 3,942,221.

The present invention relates to thin-walled tubular material and more particularly to apparatus for severing a thin-walled flexible tubular material of indefinite length advancing about a support mandrel, into a plurality of predetermined length segments of the tubular material.

In general, small diameter, flexible, thin-walled tubing is prepared from a wide variety of different materials in continuous indefinite lengths. The tubing, usually formed by extrusion may be required to undergo an additional series of treatments, such as, for example purifying, drying, curing and the like, that may be necessary to attain desired properties prior to storage and shipment. It is also frequently desirable, or even required, that the tubing be supplied in predetermined lengths that are shorter than may be technically or economically feasible to prepare directly from a continuously operating extruder.

Collecting continuous, indefinite lengths of tubing in a flattened condition on reels, and cutting measured lengths therefrom with square cut ends is an expedient way of handling the problem. However, measured lengths of flattened tubing, cannot be continuously filled, as is required in certain applications such as, for example in preparing a wide variety of processed food products.

In the food casing and processing industry, small diameter, thin-walled flexible tubing has, for a number of years, been prepared in a pleated and compressed form commonly called shirred casing sticks, wherein a continuous measured length of as much as 12 meters or more of tubing is compressed into a tubular strand of about 15 cm. that can then be readily continuously stuffed using automatic stuffing apparatus. It is highly desirable that the ends of the measured lengths of casing should be cut square and have no tab ends to obstruct the bore of the shirred casing stick. Obstructions in the bore or tab ends which occlude the bore, can interfere with a filling tube member typically used in automatic stuffing or filling equipment and cause breakage or damage of the casing stick.

Continuous lengths of tubular food casings may be prepared from materials such as cellulose, regenerated cellulose, collagen, alginate and the like and shirred casing may be prepared therefrom using any one of a number of methods and apparatus as, for example described in U.S. Pat. No. 2,983,949 (Matecki), 2,984,574 (Matecki), 3,110,058 (Marbach), 3,158,896 (Marbach) and 3,704,483 (Urbutis, et al).

For purposes of economy and efficiency, shirred casing sticks containing predetermined lengths of casing are made available to food processors. In some instances, obtaining shirred casing sticks which contain substantially equivalent lengths of tubular casing is difficult since the materials from which these tubular casings are fabricated exhibit properties that render them difficult to regulate, control and measure as they are being shirred, and particularly when they are being continuously shirred. Typical methods and apparatus for measuring or otherwise controlling the length of the tubular material in the shirred casing stick are disclosed, for example in U.S. Pat. Nos. 3,594,855 (Urbutis), 3,110,058 (Marbach), 3,741,779 (Urbutis et al).

When a predetermined length of tubular casing has been shirred on a shirring mandrel, separation thereof from a supply of said casing is desired so that individual sticks of compressed, shirred casing can be prepared and then removed from about the mandrel. Some typical methods of severing a length of shirred tubular casing from the casing supply that are known are described in U.S. Pat. Nos. 3,110,058 (Marbach) and 3,112,517 (Ives).

The advent of automatic stuffing machines, such as described in U.S. Pat. No. 3,191,222 to Townsend, has added other important factors to the quality requirements of shirred casing sticks. In U.S. Pat. No. 3,471,305 to Marbach, for example the importance of the integrity of the ends of shirred casing sticks is disclosed in order to prevent breakage of the casing stick during operation of the automatic stuffing equipment by the food processor.

In accordance with the present invention there is provided apparatus for automatically severing thin-walled tubing of indefinite length into a plurality of segments comprising in combination: a support mandrel; means for advancing a continuous length of thin-walled tubing about said mandrel; a movably mounted restraining member adaptable to restrain the advance of a thin-walled tubing at a predetermined position on said mandrel; tensioning means adapted for engaging a thin-walled tubing that has advanced beyond said restraining member position about said mandrel after said restraining member restrains the advance of the tubing and for tensioning tubing about said mandrel intermediate said restraining member and said tensioning means; and a plurality of severing means movably mounted about said mandrel having means for being traversed into and out of severing engagement with thin-walled tubing about said mandrel intermediate said restraining member and said tensioning means.

There is also provided a severing apparatus for tubular material sheathed about a support mandrel comprising a plurality of blade holders having severing blades mounted on said holders disposed in a substantially planar arrangement about a mandrel and adapted to be reciprocated to and from the surface of said mandrel, each of said severing blades being pivotably mounted on a blade holder and having two spaced apart tubing engaging edges, the bisector of the angle subtended by said edges on said severing blade defining the pivot point for said blade, and means for reciprocating said blade holders and severing blades into and out of severing engagement with a tubular material sheathed about said mandrel.

In an alternate embodiment of the invention, the blade holders are provided with more than one blade, such as a pair of blades each pivotally mounted on a blade mount clevis, said clevis being in turn pivotally centrally mounted on said blade holder, each of said blades having two spaced apart angularly disposed tubing engaging edges, th bisector of the angle subtended by said edges on said blade defining the pivot point for said tubing engaging blade, to provide in combination, a free-floating self-centering severing engagement with a tubing material sheathed about said mandrel.

The method and apparatus of the invention will become more clear when considered together with the accompanying drawing which is set forth as being merely illustrative of the invention and is not intended to be limitative thereof and wherein:

FIGS. 3 to 8 are enlarged, fragmented side views, part in section, schematically illustrating sequential operation of the components of the apparatus shown in FIG. 1 and FIG. 2.

FIG. 9 is an enlarged fragmented front elevation view of the casing severing members shown in FIGS. 1 to 8, with the upper blade holder shown partly in section.

FIG. 10 is side elevation view of the lower blade holder shown in FIG. 9.

FIG. 11 is a front elevation view partly in section taken along line 11—11 of FIG. 10.

FIG. 12 is a front elevation view of the blade mount shown in FIGS. 9, 10, 11.

FIG. 13 is a front elevation view of the cutting blade shown in FIGS. 9, 10, 11.

Figure 1:
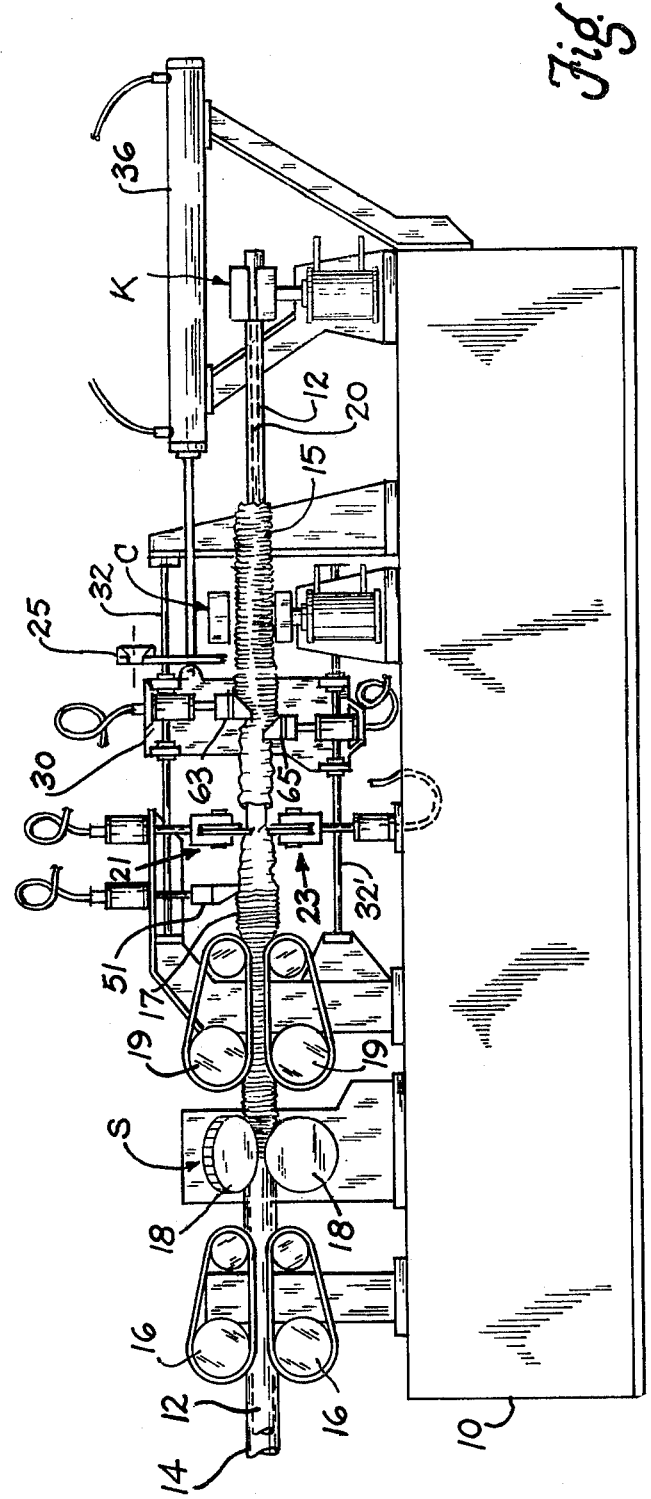
FIG. 1 is schematic side elevation view, illustrating one embodiment of the apparatus of the invention.

Turning now to the drawing, wherein like reference numerals denote like parts, there is shown in FIG. 1 a shirring apparatus, generally designated by reference numeral 10 which can be the same as or similar to the shirring apparatus disclosed and described in U.S. Pat. Nos. 2,983,949, 2,984,574, and 3,115,669 all to Matecki. Shirring apparatus 10 generally comprises a hollow mandrel 12 which is positioned and aligned by means of clamps C and K to be substantially central to a shirring means, denoted by letter S. As disclosed and described in the above-identified U.S. patents to Matecki, the shirring means S consists of three cogged wheels 18 axially positioned about hollow mandrel 12 which wheels serve to grip, pleat and advance successive portions of a continuous length of inflated tubular casing 14 along hollow mandrel 12. Clamps C and K are equipped with mating ports (not shown) which lead to the bore 20 of hollow mandrel 12 so that air can be admitted continuously through the bore 20 of hollow mandrel 12 to inflate a continuous length of tubular casing 14 as it is advanced to and through the shirring apparatus disclosed and described in U.S. Pat. No. 3,590,422 to Matecki.

A pair of rotatably driven belts 16 is positioned forward of the shirring means S to engage a continuous length of inflated tubular casing 14 and advance it over and about the hollow mandrel 12 to the shirring means S. A holdback or compacting means similar to that described in U.S. Pat. No. 3,594,855 to Urbutis is positioned downstream of the shirring means S. The holdback means comprises a pair of driven belts 19 that are generally advanced in the same direction as the advance of shirred tubular casing 17 and act to provide a continuous retarding force to the shirred casing 17 to compact it as it is advanced along and about the mandrel 12.

Figure 2:
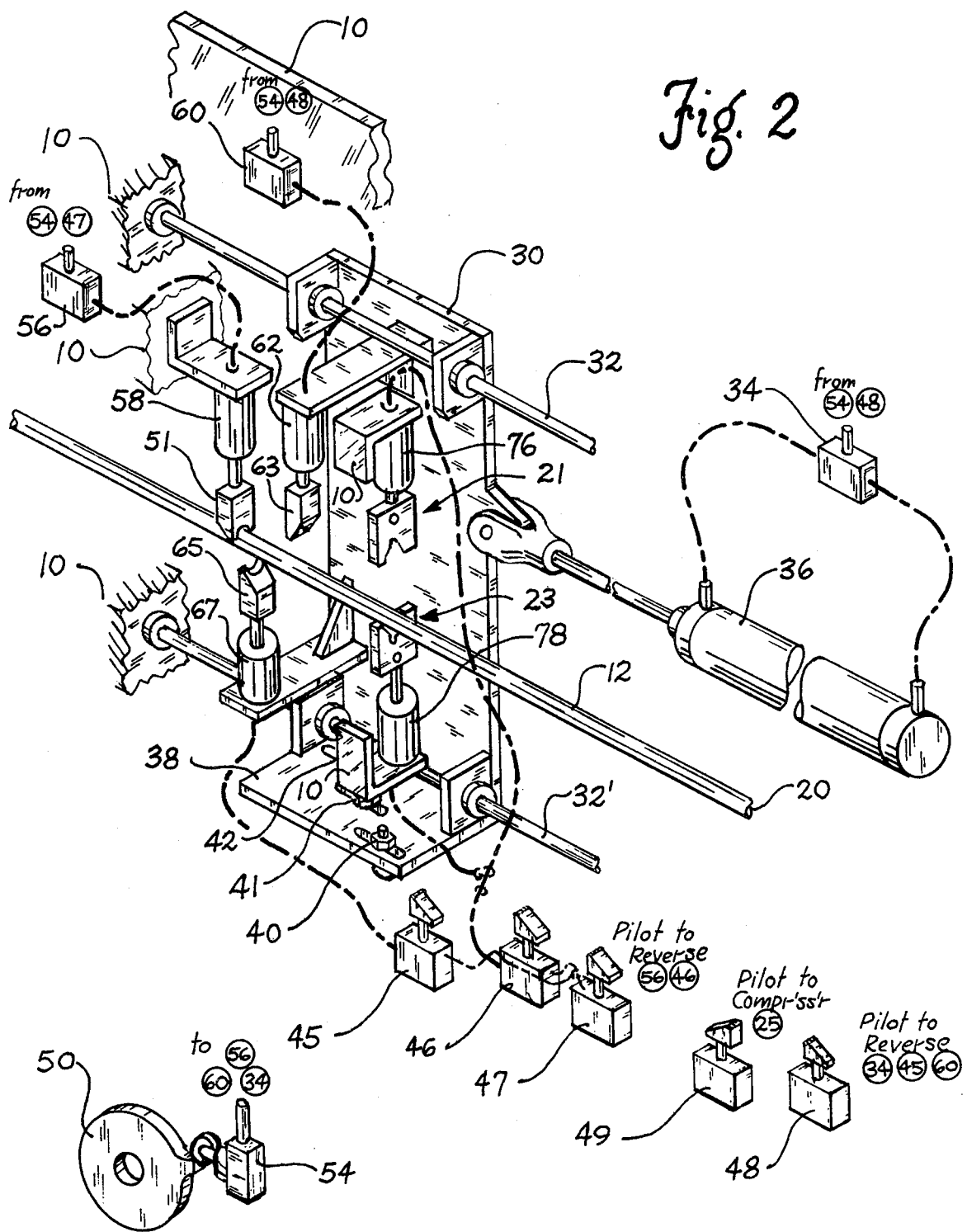
FIG. 2 is a schematic perspective view, part in section, illustrating one embodiment of the apparatus of the invention.

Referring now to FIGS. 1 and 2, a restraining member 51 is positioned above the mandrel 12 adjacent to the discharge end of the holdback or compacting means 19. The restraining member 51 is vertically secured to the end of the piston rod of reciprocally operating cylinder 58 that is mounted on the frame of the shirring apparatus 10.

A carriage 30 is slidably mounted on a pair of spaced guide rods 32, 32' secured to the frame of shirring apparatus 10. One end of carriage 30 is secured to the piston rod of cylinder 36 that is mounted on the frame of the shirring apparatus 10. An upper gripping finger 63 is connected to the piston rod of operating cylinder 62 which is secured to carriage 30 vertically aligned above mandrel 12. A lower gripping finger 65 is connected to the piston rod of operating cylinder 67 which is secured to carriage 30 vertically aligned below mandrel 12.

Also secured to the frame of the shirring apparatus 10 are a pair of opposed casing severing members shown generally as 21 and 23 aligned about mandrel 12 and located at a station downstream from restraining member 51. For purposes of illustration only, casing severing members 21 and 23 are shown operating in the same plane as restraining member 51 and gripping fingers 63 and 65. However, to provide for passage of gripping fingers 63 and 65 traversing along the axis of mandrel 12 secured to carriage 30, the plane of operation of casing severing members 21 and 23 should preferably be at an angle different from the vertical plane of operation of gripping fingers 63 and 65.

A typical operation of the apparatus of the invention will now be described and will be more readily understood when considered with the accompanying drawing.

As described in U.S. Pat. No. 3,594,855 to Urbutis, feed belts 16 (FIG. 1) connected through various drive means and meshing gears provide the means by which a continuous length of inflated casing 14 is determined and measured as it is being advanced by feed belts 16 to the shirring means S. Further as described in U.S. Pat. No. 3,594,855, cam 50 (FIG. 2) is caused to rotate at one revolution for each length of casing 14 measured by feed belts 16 and actuation of the casing severing cycle of the present invention is readily regulated and controlled thereby.

The single lobe of cam 50 (FIG. 2) contacts pilot air valve 54 to initiate the start of a casing severing cycle and successively actuate the operating valves, pistons and controls associated with the severing means of this invention.

Referring now to FIGS. 1 to 8, actuation of pilot valve 54 by cam 50 (FIG. 2) operates line valve 56 to pressurize air cylinder 58 advancing restraining member 51 towards mandrel 12 to engage shirred casing 17 advancing from holdback belts 19 on mandrel 12, and thereby restrain the further advance thereof during the cycle required to separate, sever and compress a predetermined length of shirred casing from continuous supply. Simultaneously, pilot valve 54 operates line valve 60 to pressurize cylinder 62 and advance upper gripping finger 63 to engage the shirred casing 17 on mandrel 12 downstream of the position of restraining member 51. This establishes the condition illustrated in FIG. 3.

Actuation of pilot valve 54 by cam 50 also actuates valve 34 to pressurize the rod end of cylinder 36 advancing carriage 30 along slide rods 32, 32' downstream from the position of restraining member 51, illustrated in FIG. 4.

Figure 6:
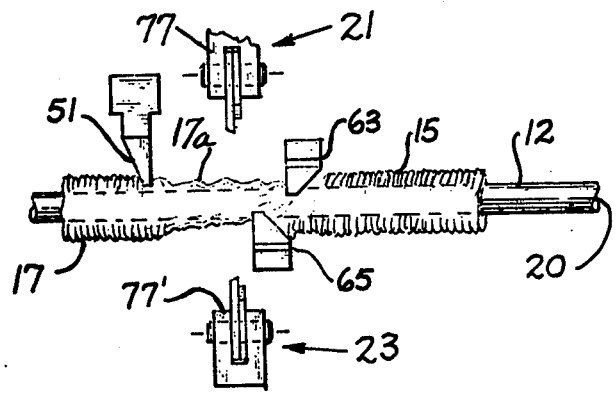

As shown in FIG. 2, camming members 40, 41 and 42 are adjustably mounted on carriage 30 on a foot member 38 in three different planes parallel to slide rods 32, 32'. As carriage 30 is advanced, a short distance (about 3 cm.) along slide rods 32, 32' from the starting position shown in FIG. 3, cam member 40 engages and actuates valve 45 to pressurize cylinder 67. Lower gripping finger 65 is thereby upwardly advanced into gripping engagement with shirred casing 17 on mandrel 12 generally opposed, to upper gripping finger 63 as shown in FIG. 4. The advance of carriage 30 with gripping fingers 63 and 65 in gripping engagement with shirred casing 17 separates the pleats or deshirrs the casing intermediate restraining member 51 and gripping fingers 63 and 65 (FIGS. 5 and 6).

Figure 7:
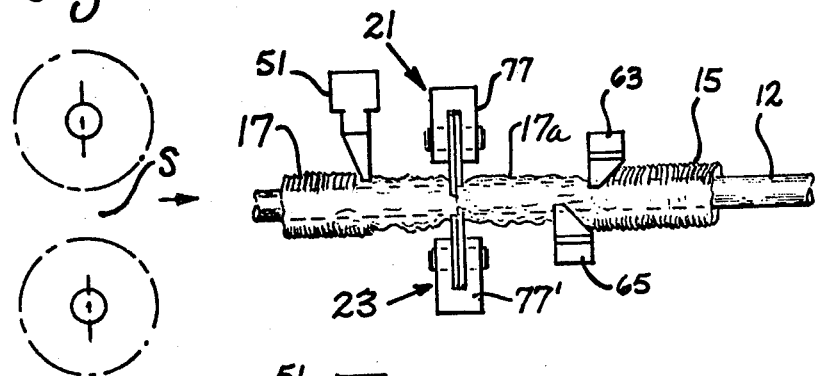

Carriage 30 continues to be advanced along slide rods 32, 32' by cylinder 36 to a station approximately 12 cm. from the starting position (FIG. 6) where camming member 41 on carriage 30 (FIG. 2) engages and actuates valve 46 to operate opposed casing severing members 21 and 23. Air is thereby simultaneously admitted to cylinders 76 and 78 whereby upper and lower blade holders 77, 77', respectively, are radially advanced toward mandrel 12 into severing engagement with the deshirred casing 17a (FIG. 7). A portion of the casing 17a is thereby scored and/or cut uniformly at a plurality of points about the circumference thereof. It is important that the deshirred portion of casing is scored and/or cut at four or more, and preferably at, at least eight points substantially uniformly about the circumference of the mandrel 12 to obtain a suitable substantially "square-cut" end. It would be apparent that the more points about the circumference of the tube that may be scored and/or cut, and then tension separated in accordance with the practice of the invention, the more uniform will the separated edge thereof.

Figure 8:
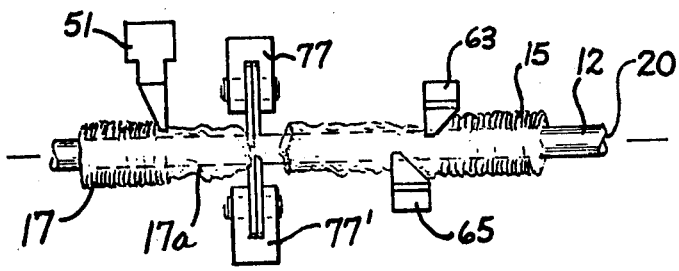

The carriage 30 continues to be advanced along slide rods 32, 32' by cylinder 36, thereby further advancing upper and lower gripping fingers 63 and 65. The casing 17a intermediate restraining member 51, severing members 21 and 23 and gripping fingers 63 and 65 is tensioned across the scored and/or cut points about the circumference of the tubular casing until the casing is severed and separates into segments containing predetermined lengths of casing as shown in FIG. 8. The carriage 30 is advanced further a short distance (about 6 cm.) until cam member 41 on the carriage 30 engages and actuates valve 47, (FIG. 2) to provide pilot air pressure to reverse valves 56 and 46, thereby releasing air pressure on associated cylinders 58, and 76, 78 respectively, to retract restraining member 51 and severing means 21, 23. Restraint on the advance shirred casing 17 is thereby removed permitting its unimpeded advance along mandrel 12 from shirring passage S.

Carriage 30 is caused to continue to advance with the upper and lower gripping fingers, 63 and 65, engaging the severed casing 15 and advancing it along the mandrel to a station about 60 cm. from the starting station where it is positioned to be compressed by compressor arm 25 (FIG. 1).

Near the end of the stroke of carriage cylinder 36, cam member 42 mounted on carriage 30 (FIG. 2) engages valve 48 to provide pilot air pressure to reverse the valves 34, 45 and 60 controlling associated cylinders 36, 67 and 62 respectively, which thereby pressurizes the piston end of cylinder 36 reversing the direction of carriage 30 and retracts upper and lower gripping fingers 63 and 65, resulting in all elements of the severing device to return to their respective start positions for the succeeding casing severing cycle. As the carriage 30 is being returned to the start position, cam member 41 actuates valve 49 (reverse direction actuation) which operates an appropriate air cylinder (not shown) to drop compressor arm 25 onto mandrel 12.

When compressor arm 25 engages mandrel 12 a limit switch is activated that in turn activates an air valve, and associated cylinder (not shown), advancing compressor arm 25 toward closed clamp K with the separated segment of shirred casing 15 therebetween. The action of compressor arm 25 reestablishes the compressed, pleated condition on the short length of deshirred casing on both the fore and aft sections thereof. In U.S. Pat. No. 3,158,896 to Marbach is disclosed the method and operation of compressor arm 25 in compressing shirred casing segments against the front wall of clamp K.

In the casing shirring art, the operation of shirring machines generally, has required that a predetermined length of shirred casing be severed from an advancing supply of tubular casing material before removing from the shirring machine. Consequently the mandrel 12 which defines and forms the bore of the finished casing stick 15, is preferably cantilever supported by clamps C, K, on machine frame 10 (FIG. 1). The clamps C, K are alternately opened and closed to permit removal of a finished casing stick 15 from mandrel 12, while maintaining the mandrel in alignment with the shirring means S, as disclosed and described in U.S. Pat. No. 3,158,896 to Marbach.

It is difficult to maintain a desired, precise alignment of the cantilever mounted mandrel 12 to shirring means S and to the plane of operation of severing means 21, 23 spaced from the clamp support C. Thus one embodiment of the invention contemplates a plurality of scoring and/or cutting edges arranged in opposed self-centering, blade holders 77, 77' adapted to engage and encircle mandrel 12 and thereby score and/or cut deshirred casing 17a substantially uniformly at, a plurality of points about the mandrel. In a preferred embodiment as shown in FIG. 9, an eight point severing blade contact with mandrel 12 is provided by casing severing members 21 and 23 oppositely actuated by pneumatic cylinder 76, 78. Each of the severing members 21, 23 has four tubing engaging edges adapted for scoring and/or cutting engagement with mandrel 12 in a self-centering action. Thus, in the event of a less than perfect initial alignment of the mandrel 12 and severing members 21, 23, such misalignment is self-corrected by the self-aligning severing members.

Refer now to FIGS. 9 to 13 wherein is shown the elements of the casing severing members shown generally as 21, 23. Blade holders 77, 77' (FIG. 9) are shown secured to the piston rods of pneumatic cylinders 76, 78 respectively.

Blade holder 77' (FIGS. 10, 11) comprises a clevis shaped member adapted to pivotally mount blade mount 80 on pivot pin 82 secured in blade holder 77'. Blade mount 80 (FIG. 12) is a slotted member with central pivot hole 98 trunnioned on pivot pin 82. Blade mount 80 is also adapted to pivotally mount a pair of severing blades 84, 84' in opposite hand (back to back) arrangement. Pivot hole 88 of blade 84, and pivot hole 88 of blade 84', each rotatably mount their respective blade on individual opposed parallel blade pivot pins, 86. Each pin 86 is secured into respective hole 188 in one portion of blade mount 80 and each pin 86 passes through a pivot hole 88 of one of the back to back blades 84, 84' and also through limit hole 90 of the other back to back blade 84', 84 as well as through the other portion of blade mount 80. Pin 82 passes through blade holder 77', through hole 98 in both portions of blade mount 80 and through holes 92 in both blades 84 and 84'.

The blade 84 (FIG. 13) is provided with spaced apart bottom and side tubing engaging edges 94, 96, respectively. When the center of mandrel 12 is used as a central reference point, to define a line "Y" from the center of pivot hole 88 to the centerline of mandrel 12; the edges 94, 96 are each ground at an equal angle from the line "Y" such as angle α (FIG. 13), for example 45°. Limit hole 90 is somewhat larger than blade pivot pin 86 and blade hole 92 is larger than blade mount pivot pin 82 to allow limited movement of each blade 84, 84° about its respective pivot pin 86. The difference in diameter between limit hole 90 and pivot pin 86 defines a predetermined limit of pivotal movement permitted for each blade 84, 84' about its respective pivot pin 86. Thus the blade assembly described provides two degrees of freedom to pivotally align the blade tubing engaging edges into uniform gripping contact with mandrel 12 and thereby uniformly score and/or cut the casing 17a therebetween.

Activation of severing means 21 and 23 into severing engagement with mandrel 12 accordingly, provides for 8 tubing engaging edges contacting the mandrel substantially uniformly about the mandrel. The pivotally mounted blade mount 80 and the pivotally mounted severing blades provide sufficient self-aligning capability to overcome possible misalignment of the mandrel 12 and the tubing engaging edges.

In an alternate embodiment, a single severing blade such as blade 84 having two spaced apart tubing engaging edges is pivotally mounted in a blade holder or blade mount as described herein. Blade holders may be rigidly or pivotally secured to piston rods or the like of at least two air activated cylinders mounted uniformly about a mandrel. A tubular material may thereby be scored and/or cut at a plurality of points substantially uniformly about the circumference of the tubing to sever a continuous length thereof into segments having substantially "square cut" ends.

Thus the present invention provides simple, efficient means for automatically severing tubular materials sheathed about a support mandrel and for continuously and automatically producing from a continuous indefinite length of tubular material, and particularly shirred tubular food casing, segments of such tubular material that may contain predetermined lengths thereof.

While the invention has been described with particularity and in some detail, it should be understood that changes, modifications and alterations can be made therein; in addition to those suggested and illustrated hereinabove, without departing from the scope and spirit of the invention.

What is claimed is:

1. Severing apparatus for flexible, thin-walled tubing material sheathed about a support mandrel comprising at least two severing blades disposed in a substantially uniform circular planar arrangement about a mandrel and adapted to be reciprocated to and from the surface of said mandrel, each of said severing blades being pivotally mounted about an axis parallel to said mandrel on a blade mount and having two spaced apart, angularly spaced tubing engaging edges, the bisector of the angle subtended by said engaging edges on said blade defining a pivot point with an axis parallel to said mandrel for mounting said severing blade on said mount and means for reciprocating said blade mount with said severing blade mounted thereon.

2. The apparatus of claim 1 wherein at least two blade mounts are reciprocated into and out of opposing engagement with said mandrel.

3. The apparatus of claim 1 wherein said tubing engaging edges are cutting edges.

4. The apparatus of claim 1 wherein said tubing engaging edges are scoring edges.

5. The apparatus of claim 1 wherein said blade mount is pivotally mounted to said reciprocating means.

6. The apparatus of claim 1 comprising pivot limit means for said pivotally mounted severing blades.

7. The apparatus of claim 6 wherein said pivotally mounted severing blades include pivot limit means.

8. Severing apparatus for flexible, thinwalled tubing material sheathed about a support mandrel comprising at least two severing means disposed in a substantially uniform circular planar arrangement about a mandrel and adapted to be opposely reciprocated conjointly to and from the surface of said mandrel, each of said severing means comprising two severing blades each pivotally mounted about an axis parallel to said mandrel at opposite ends of a blade mount, each of said severing blades having two spaced apart tubing engaging edges that are disposed at an angle to each other permitting both of said edges to engage said mandrel, the bisector of the angle subtended by said edges defining a pivot point with an axis parallel to said mandrel for mounting said severing blade on said mount, and means for reciprocating said severing means.

9. The severing apparatus of claim 8 wherein the blade mount of each of said severing means is pivotally mounted to said reciprocating means at a pivot point that is central to the pivot points for the tubing engaging blades mounted on said blade mount.

10. The severing apparatus of claim 8 wherein the tubing engaging edges are cutting edges.

11. The apparatus of claim 8 wherein said tubing engaging edges are scoring edges.

* * * * *